July 9, 1940.   A. G. FREEBORN   2,207,583
ELECTRICAL TREATMENT OF WATER TO PREVENT THE EFFECTS OF HARDNESS
Filed Dec. 29, 1937   2 Sheets-Sheet 2

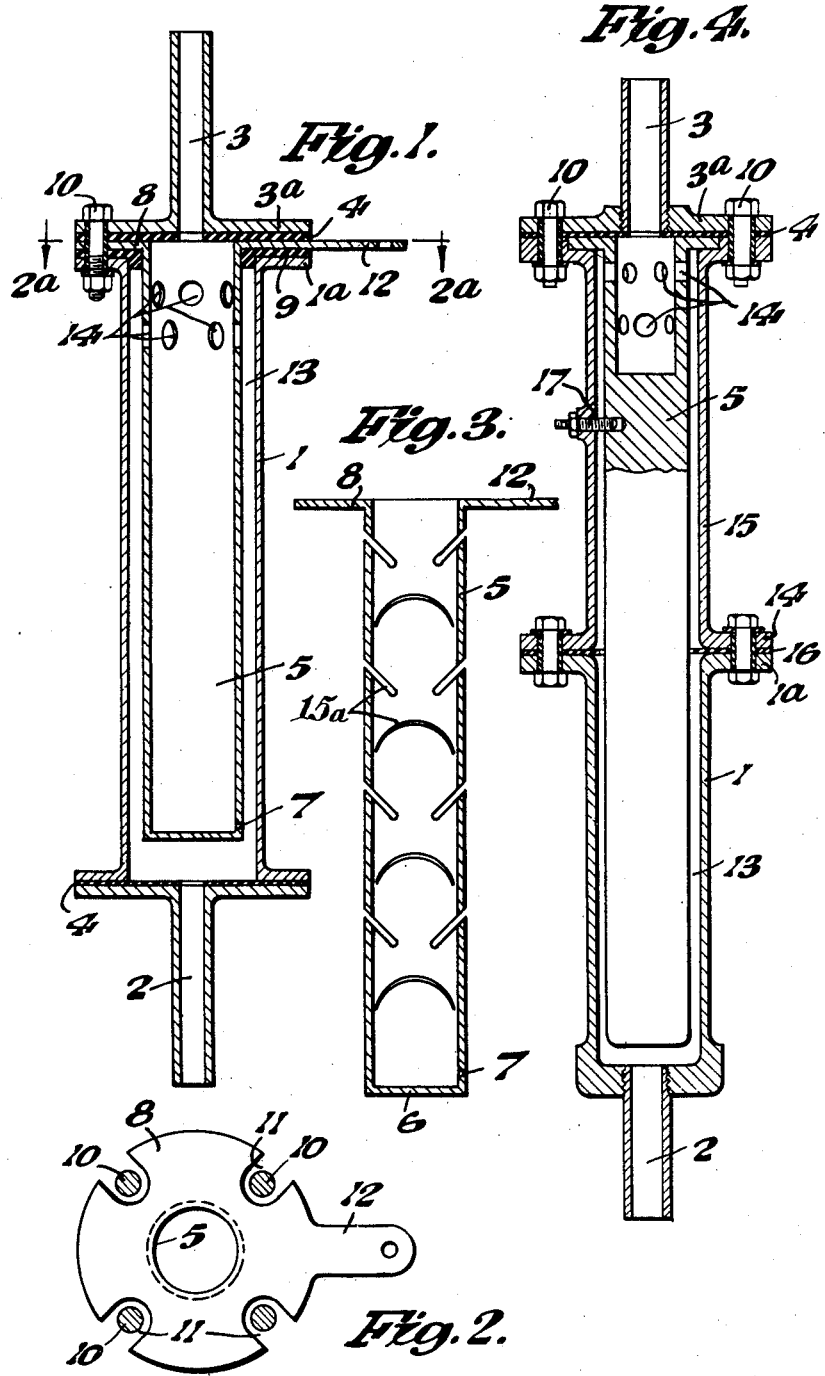

INVENTOR
ALBERT G FREEBORN
PER George Hughes
ATTORNEY

Patented July 9, 1940

2,207,583

UNITED STATES PATENT OFFICE 2,207,583

ELECTRICAL TREATMENT OF WATER TO PREVENT THE EFFECTS OF HARDNESS

Albert George Freeborn, Wimbledon, England

Application December 29, 1937, Serial No. 182,346
In Great Britain November 18, 1936

2 Claims. (Cl. 204—25)

My present invention relates to an improved method for treating water to prevent the effects of hardness due to the presence of salts, and more particularly to such methods in which a source of electric current is required to set up the desired action, e. g. by way of an anode in the water. The present invention does not contemplate the removal of the said salts, e. g. calcium carbonate, but more particularly is concerned with rendering them inert to scale formation or coating of conduits, tanks, boilers and the like. For example when water treated by means of this invention is evaporated, the salts in solution are thrown down in a form which can be washed out without any difficulty, in fact, in a boiler under pressure, they could be cleared right out by means of a suitable blow down without any appreciable amount of scale forming on the boiler plates, whilst when such water is used for laundry purposes, a good lather is easily obtained without the use of an undue amount of soap or other detergent.

I have discovered that in order to obtain the desired results in a highly efficient and uniform manner it is necessary that there shall be a certain range of potential difference between a source of constant electrical discharge immersed in the water, and earth, or between anode and cathode, and for all practical purposes the potential difference between anode and cathode should be exceedingly small, that is to say not exceeding substantially 12 millivolts, and consequently according to my present invention a method of treating water to overcome the effects of hardness is characterised broadly in that the water is brought in close proximity to an anode and subjected thereby to a constant electrical force such that there is a constant potential difference of approximately 12 millivolts or less between said anode and earth or cathode, the current supply being uni-directional.

As is well-known perfectly pure water is a non-conductor of electricity, but the presence of salts, e. g. calcium carbonate makes water conductive. These salts take the form of molecules in suspension in the pure water, and conceivably each molecule has a film of pure (non-conducting) water around it. As a possible explanation of the action or phenomenon arising out of my invention, as each said molecule comes into contact with the live anode connected to a uni-directional current source, the resistance of the film of pure water is broken down and a static D. C. charge of electricity is imparted to the molecule of salt, and consequently as the charging of the molecules is uniform all the molecules will repel one another. However the anode is only at a sufficiently high potential to break down the resistance of the film of water surrounding each molecule, and as soon as each molecule receives its said static charge it is repelled by the anode. It follows that as the anode will commence repelling each molecule of salt as soon as each molecule acquires a fraction of its ultimate charge, which is of the same polarity as the anode, the charged molecules will be completely repelled before they can acquire the full potential at the anode. By this means I assume that all of the molecules have a static charge slightly below the potential of the anode.

The reason why the charged molecules do not pass over to the cathode is that the charge at the anode is itself only just sufficient to break down the electrical resistance of the film of water, and before the molecules can acquire this potential they are repelled by the anode, so that the charge in the molecules is not in itself sufficient to break down the resistance of its enveloping film. It follows that if the potential at the anode is too low it will not break down the film of pure water around each molecule of salt, but if it is too high it breaks down the film and charges the molecule to such a high potential that the static charge of the molecule breaks down its enveloping film of pure water so that it travels across to the cathode and discharges to earth.

Actually in practice when water treated according to my invention is evaporated a thin film of scale, approximately $1/100$ of an inch accumulates on the plates of the boiler, and after this film is formed, all of the remaining salts thrown out of solution come down in the form of mud, and it is not an uncommon practice for even this thin film of scale to leave the boiler plates in flakes, following which a new film is formed no thicker than the preceding film.

Two conditions attaching to the carrying out of the present invention are:

1. That the potential difference between the electrodes shall be not more than 12 millivolts.
2. That the current itself shall be D. C.

This invention will work equally well on either smooth D. C. such as would be obtained from a battery, or D. C. in which there is a ripple, such as might be the case from, for example, a dynamo or rectifier, but in using current other than smooth, the mean potential is the critical potential that has to be considered.

Suitable apparatus for carrying out the invention can be inserted in the run of a water main or alternatively, apparatus can be placed in a water storage tank or reservoir. In the descriptions of the methods and apparatus which can be used in the claims made, the word cathode is only used as a convenient name for that part of the apparatus which is usually at earth potential, and the word anode as a convenient name for that part of the apparatus which is at a potential either above or below the cathode.

Generally speaking, the cathode will constitute a part of the main water system of pipework of the premises in which this invention is employed or be electrically connected to it so that, generally, it will actually be at earth potential, whereas the anode will be insulated from the main water system and generally, though not necessarily, the only path through which electrical energy can flow between the anode and the cathode being through the water which is being treated, and in order that the water shall obtain full treatment, it is necessary for all of it to come in as close proximity as possible to the anode.

In order that my invention may be clearly understood and readily carried into effect two sheets of drawings are appended hereto illustrating embodiments thereof, and wherein, Fig. 1 is a sectional elevation showing one form of anode containing adaptor ready for connection in a water supply conduit.

Fig. 2 is a section on the line 2ª—2ª of Fig. 1.

Fig. 3 is a sectional elevation of an alternative form of anode.

Fig. 4 is a sectional elevation of a still further modification, and

Figure 5:
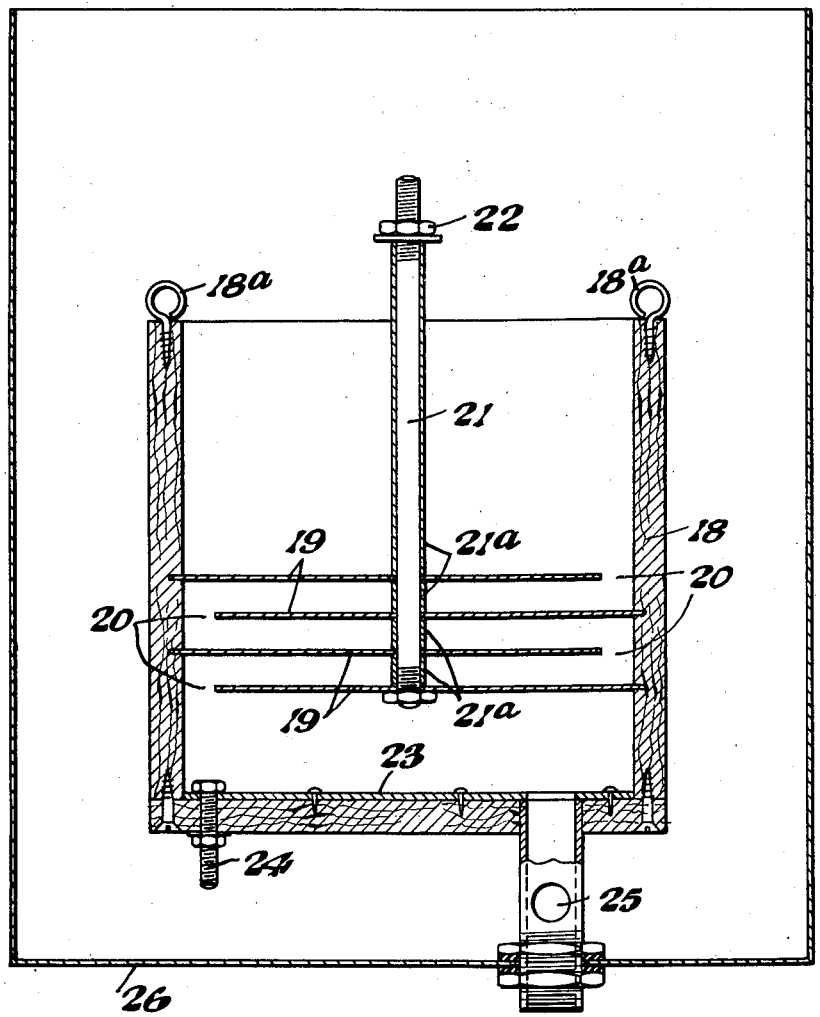
Fig. 5 shows a suitable method of applying the invention to a water storage tank or reservoir, e. g. a gravity tank for household and like requirements.

Referring to the drawings the adaptor shown in Figs. 1 and 2 comprises an outer tubular cathode 1 having end inlet and outlet extensions 2 and 3 respectively adapted to be connected in series in the appropriate supply conduit. Insulation 4 is interposed between the flanges of the ends of the cathode 1 and the flanges of the extensions 2 and 3, and a suitable earth connection is made to the cathode. The anode is a tubular concentric body 5 preferably closed at its base 6 and provided with a small air vent 7 to avoid trapping of air in the anode sufficient to form an air-lock. The anode is flanged at its top, as at 8, and is insulated from the cathode by the adjacent insulation 4 and another insulator 9, bolts 10 being passed through the flanges 1ª, 3ª and 8 of the cathode 1, extension 3 and anode 5 respectively, such bolts having insulating sleeves thereon, or being annularly spaced from the bolt openings 11 in the flange 8 of the anode. An integral or affixed terminal 12 is carried by the flange 8 for connection to low voltage D. C. source of supply, e. g. a small battery.

The water entering at 2 passes over the outside of the anode and passes from the annular space 13 between the anode and cathode through holes 14 in the upper end of the cathode to the outlet extension 3.

As an alternative arrangement the anode can have a plurality of narrow slits 15ª as shown in Fig. 3, preferably cut at angles as shown to afford long narrow slits which breaks the water into a plurality of narrow streams while flowing into the anode. The anode is made as thick as reasonably possible. By this means a great proportion of the water makes direct contact with the anode.

To still further increase the effective area of contact of water and anode, part of the outer casing of the adaptor can be part of the anode. For example as shown in Fig. 4, the tubular cathode 1 can support by its upper flange 1ª the flanged lower end 14 of an outer anode 15. Suitable insulation 16 being interposed between the two flanges. An inner anode 5 which can be solid for the greater proportion of its length is connected by a bridge member 17 to the outer anode 15, and the upper part of the inner anode 5 can be constructed similarly to the anode shown in Fig. 1 or Fig. 3. If desired the conduit connected to the extension 2 can form the earth for the cathode, in which event the extension 2 can be connected to or formed integral with the cathode as shown in Fig. 4.

When the present invention is to be applied to a storage tank, a container such as 18 can be suspended by eyes 18ª or other suitable means within the tank 26, such container being composed of suitable insulating material, and the water forced to traverse a circuitous path over a plurality of anode plates 19 extending completely across the interior of the container with the exception of narrow gaps 20 which are arranged alternately on opposite sides of the container. The plates can be embedded in the walls of the container or abut against it, and are electrically connected to a common conductor in the form of a bolt 21, preferably having conducting distance pieces 21ª thereon to firmly clamp the anode plates 19 in electrical connection with the bolt 20, which has a terminal 22 at its upper end. The cathode may comprise a plate 23 secured in the base or other convenient part of the container 18. A terminal 24 can connect this cathode plate to earth or to the opposite pole of the current source to that which is connected to the anode 20. An outlet 25 discharging into the tank 26 is provided in the base of the anode container; or if desired the reverse operation may apply, i. e. the water to pass from a suitable conduit, e. g. rubber hose, up through the passage 25 and overflow the top of the container 18.

Efficient results are obtained by a battery source of current, but D. C. mains supply or rectified A. C. can be employed, such resistance and fuse or other safety devices as may be required being employed.

I claim:

1. A method of pre-treating water on its way to the consuming means in order to overcome the effects of hardness without chemical change in the water, consisting in conveying the water to the consuming means over an anode connected to a uni-directional current source of supply, and also providing in combination with said anode a cathode also exposed to contact with the water, the anode being at a potential not exceeding 12 millivolts with respect to the cathode, and the anode being so disposed that as much as possible of the water will come into actual contact with it.

2. A method of pre-treating water on its way to the consuming means in order to overcome the effects of hardness without chemical change in the water, consisting in conveying the water to the consuming means over an anode connected to a uni-directional current source of supply, and also providing in combination with said anode a cathode also exposed to contact with the water, the anode being at a potential substantially below 12 millivolts with respect to the cathode, and the anode being so disposed that as much as possible of the water will come into actual contact with it.

ALBERT GEORGE FREEBORN.